United States Patent
Arashitani et al.

(10) Patent No.: US 8,340,482 B2
(45) Date of Patent: Dec. 25, 2012

(54) OPTICAL FIBER HOLDING APPARATUS

(75) Inventors: Yoshihiro Arashitani, Tokyo (JP);
Toshio Miyahara, Tokyo (JP);
Yoshihiro Emori, Tokyo (JP);
Masanobu Nakamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 240 days.

(21) Appl. No.: 12/732,640

(22) Filed: Mar. 26, 2010

(65) Prior Publication Data
US 2010/0247055 A1 Sep. 30, 2010

(30) Foreign Application Priority Data

Mar. 31, 2009 (JP) ................. 2009-087355
Mar. 31, 2009 (JP) ................. 2009-087360

(51) Int. Cl.
*G02B 6/42* (2006.01)
*G02B 6/26* (2006.01)
*G02B 6/00* (2006.01)

(52) U.S. Cl. ........................ 385/32; 385/137
(58) Field of Classification Search .............. 385/32, 385/137
See application file for complete search history.

(56) References Cited

U.S. PATENT DOCUMENTS

| | | | | |
|---|---|---|---|---|
| 4,724,316 A * | 2/1988 | Morton | ............. | 250/227.14 |
| 6,459,068 B1 * | 10/2002 | Yamaura et al. | ............. | 219/121.6 |
| 6,958,907 B2 * | 10/2005 | Sato et al. | ............. | 361/690 |
| 7,043,131 B2 * | 5/2006 | Koyano et al. | ............. | 385/136 |
| 7,366,386 B2 * | 4/2008 | Sako et al. | ............. | 385/123 |
| 7,477,806 B2 * | 1/2009 | Williams | ............. | 385/12 |
| 7,809,236 B2 * | 10/2010 | Muendel | ............. | 385/137 |
| 2002/0037134 A1 * | 3/2002 | Akamatsu et al. | ............. | 385/32 |
| 2003/0142938 A1 * | 7/2003 | Koyano et al. | ............. | 385/123 |
| 2004/0062491 A1 * | 4/2004 | Sato et al. | ............. | 385/88 |

(Continued)

FOREIGN PATENT DOCUMENTS

CN 101373881 A 2/2009

(Continued)

OTHER PUBLICATIONS

Chinese Office Action issued Sep. 7, 2011, in Chinese Patent Application No. 201010155081.4 with English translation.

*Primary Examiner* — Rhonda Peace
(74) *Attorney, Agent, or Firm* — Oblon, Spivak, McClelland, Maier & Neustadt, L.L.P.

(57) ABSTRACT

An optical fiber holding apparatus in accordance with the present invention is characterized in that the same comprises a surface in order to hold an optical fiber which is to be a state of which is rolled up so as not to overlap with each other, wherein at least the surface is formed of a thermo conductive molding body which has a thermal conductivity to be higher than or equal to 0.5 W/mK, and which has an Asker C hardness to be between twenty and fifty. Or, the same comprises a peripheral surface in order to roll up and hold an optical fiber, wherein at least the peripheral surface is formed of a thermo conductive molding body which has the thermal conductivity to be higher than or equal to 0.5 W/mK, and which has the Asker C hardness to be between twenty and fifty. Moreover, it is desirable for the thermo conductive molding body to have a compressive strength of which a peak value is between ten and thirty $N/cm^2$ and a stabilized value is between three and ten $N/cm^2$. Furthermore, it is desirable for the thermo conductive molding body to have the thermal conductivity to be higher than or equal to 1.0 W/mK and to have the Asker C hardness to be between twenty-five and forty.

16 Claims, 13 Drawing Sheets

U.S. PATENT DOCUMENTS

| | | | |
|---|---|---|---|
| 2004/0223160 A1* | 11/2004 | Chen et al. | 356/460 |
| 2008/0130010 A1 | 6/2008 | Williams | |
| 2009/0060444 A1* | 3/2009 | Muendel | 385/137 |
| 2010/0061678 A1* | 3/2010 | Swinehart et al. | 385/12 |
| 2010/0247055 A1* | 9/2010 | Arashitani et al. | 385/137 |

FOREIGN PATENT DOCUMENTS

| | | |
|---|---|---|
| CN | 101373882 A | 2/2009 |
| JP | 2002-280498 | 9/2002 |
| JP | 2007-273600 | 10/2007 |

* cited by examiner

FIG.5

| | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| THERMAL CONDUCTIVITY | W/mK | 0.51 | 0.80 | 1.12 | 1.35 | 1.51 | 1.60 | 1.63 |
| HARDNESS | ASKER C | 49 | 21 | 41 | 25 | 33 | 36 | 31 |
| COMPRESSIVE STRENGTH | PEAK VALUE N/cm² | 28 | 10 | 24 | 15 | 19 | 20 | 15 |
| | STABILIZED VALUE N/cm² | 9.6 | 3.4 | 7.4 | 4.3 | 5.1 | 4.5 | 4.3 |
| TEMPERATURE OF AN OPTICAL FIBER (ΔT) | °C | +15 | +13 | +9 | +7 | +6 | +5 | +5 |
| STABILITY OF A COIL SHAPE | HOURS 4 | STABLE | STABLE | STABLE | STABLE | STABLE | STABLE | STABLE |
| | 24 | | STABLE | STABLE | STABLE | STABLE | STABLE | STABLE |
| | 72 | | | STABLE | STABLE | STABLE | STABLE | STABLE |
| | 120 | | | | | STABLE | STABLE | STABLE |
| | 240 | | | | | | | STABLE |

FIG.6

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| THERMAL CONDUCTIVITY | W/mK | 0.45 | 0.22 | 1.55 | 1.71 | 0.98 |
| HARDNESS | ASKER C | 30 | 21 | 55 | 65 | 18 |
| COMPRESSIVE STRENGTH PEAK VALUE | N/cm² | 15 | 10 | 31 | 55 | 9 |
| COMPRESSIVE STRENGTH STABILIZED VALUE | N/cm² | 5.8 | 3.4 | 9.8 | 21 | 3.1 |
| STABILITY OF A COIL SHAPE AFTER HOURS 4 | | STABLE | STABLE | STABLE | STABLE | STABLE |
| STABILITY OF A COIL SHAPE AFTER HOURS 24 | | STABLE | STABLE | FIBER DISCONNECTED (UNSTABLE) | STABLE | STABLE |
| STABILITY OF A COIL SHAPE AFTER HOURS 72 | | STABLE | STABLE | — | FIBER DISCONNECTED (UNSTABLE) | STABLE |
| STABILITY OF A COIL SHAPE AFTER HOURS 120 | | STABLE | STABLE | — | — | STABLE |
| STABILITY OF A COIL SHAPE AFTER HOURS 240 | | STABLE | STABLE | — | — | STABLE |
| TEMPERATURE OF AN OPTICAL FIBER (ΔT) | °C | +35 | +70 | — | — | +28 |

FIG.13

| | | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|
| THERMAL CONDUCTIVITY | W/mK | 0.51 | 0.80 | 1.12 | 1.35 | 1.51 | 1.60 | 1.63 |
| HARDNESS | ASKER C | 49 | 21 | 41 | 25 | 33 | 36 | 31 |
| COMPRESSIVE STRENGTH PEAK VALUE | N/cm² | 28 | 10 | 24 | 15 | 19 | 20 | 15 |
| COMPRESSIVE STRENGTH STABILIZED VALUE | N/cm² | 9.6 | 3.4 | 7.4 | 4.3 | 5.1 | 4.5 | 4.3 |
| STABILITY OF A COIL SHAPE | AFTER HOURS 4 | NO CHANGE | NO CHANGE | NO CHANGE | NO CHANGE | NO CHANGE | NO CHANGE | NO CHANGE |
| | 24 | | | | | | | |
| | 72 | | | | | | | |
| | 120 | | | | | | | |
| | 240 | | | | | | | |
| TEMPERATURE OF AN OPTICAL FIBER (ΔT) | °C | +18 | +15 | +11 | +8 | +7 | +5 | +5 |

FIG.14

| | | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|---|
| THERMAL CONDUCTIVITY | W/mK | 0.45 | 0.22 | 1.55 | 1.71 | 0.98 |
| HARDNESS | ASKER C | 30 | 21 | 55 | 65 | 18 |
| COMPRESSIVE STRENGTH PEAK VALUE | N/cm² | 15 | 10 | 31 | 55 | 9 |
| COMPRESSIVE STRENGTH STABILIZED VALUE | N/cm² | 5.8 | 3.4 | 9.8 | 21 | 3.1 |
| STABILITY OF A COIL SHAPE | AFTER 4 HOURS | NO CHANGE | NO CHANGE | NO CHANGE | NO CHANGE | NO CHANGE |
| | 24 | | | FIBER DISCONNECTED | FIBER DISCONNECTED | |
| | 72 | | | — | — | |
| | 120 | | | — | — | |
| | 240 | | | — | — | |
| TEMPERATURE OF AN OPTICAL FIBER (ΔT) | °C | +42 | +81 | — | — | +31 |

OPTICAL FIBER HOLDING APPARATUS

CROSS-REFERENCE TO RELATED APPLICATIONS

This application claims priority from a Japanese patent application serial No. 2009-087355 filed on Mar. 31, 2009, and Japanese patent application serial No. 2009-087360 filed on Mar. 31, 2009, the entire content of which is incorporated herein by the reference.

BACKGROUND OF THE INVENTION

1. Field of the Invention

The present invention relates to an optical fiber holding apparatus.

2. Description of the Related Art

Conventionally, an optical fiber laser is proposed (refer to such as the following patent document 1 or the like), in which an optical cavity of the Fabry-Perot type is provided, in which an amplifying optical fiber is to be an amplifying medium that is formed of a rare earth element, such as ytterbium (Yb) or erbium (Er) or the like, as an optical amplification material to be added into a core part, and then the same is to be formed by performing a connection of an optical fiber grating to each of ends of this amplifying optical fiber.

And then in accordance with this optical fiber laser an amplifying optical fiber of a double cladding type is adopted. Moreover, it is able to realize an output to be higher that is higher than or equal to such as 100 watts or the like by being able to make use of an excitation light source which has the output to be further higher. And hence this kind of the optical fiber laser which has the higher output is made use as a source of light for such as an optical communication or the like. Further, in recent years, by performing a combination with a nonlinear optical fiber which has a nonlinear optical effect to be higher in the optical fiber this kind of the optical fiber laser which has the higher output is made use for an optical signal processing unit as well in which a various kinds of optical signal processing are performed by making use of the non-linear optical effect.

[Patent Document 1] Japanese Patent Application Publication No. 2007-273600

In accordance with the amplifying optical fiber or the non-linear optical fiber that are made use for the above mentioned optical fiber laser an intensity of a light which propagates therethrough is strong as extremely. And then as a result, even in a case where an optical loss in the optical fiber is small a light energy becomes to be larger which is to be lost due to the intensity. And hence it becomes to be easier for the optical fiber to generate heat. And then this kind of the generation of heat may become a cause of such as a variation of an optical characteristic which has a temperature dependency on the optical fiber to be higher, or of a decrease in a reliability of the optical fiber and an apparatus for which the same is made use, or the like.

SUMMARY OF THE INVENTION

It is an object of the present invention to at least partially solve the problems in the conventional technology.

One aspect of an optical fiber holding apparatus in accordance with the present invention is characterized in that the same comprises a surface in order to hold an optical fiber which is to be a state of which is rolled up so as not to overlap with each other, wherein at least the surface is formed of a thermo conductive molding body which has a thermal conductivity to be higher than or equal to 0.5 W/mK, and which has an Asker C hardness to be between twenty and fifty.

Another aspect of an optical fiber holding apparatus in accordance with the present invention is characterized in that the same comprises a peripheral surface in order to roll up and hold an optical fiber, wherein at least the peripheral surface is formed of a thermo conductive molding body which has the thermal conductivity to be higher than or equal to 0.5 W/mK, and which has the Asker C hardness to be between twenty and fifty.

And thus it becomes able to obtain the optical fiber holding apparatus by which it becomes able to hold the optical fiber with having a heat dissipation to be higher and with having the optical loss to be lower.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram showing a characteristic of a thermo conductive molding body and a temperature of an optical fiber ($\Delta T$) and a stability of a coil shape regarding an optical fiber laser in accordance with the Examples 1 to 7.

FIG. 6 is a diagram showing a characteristic of a thermo conductive molding body and a temperature of an optical fiber ($\Delta T$) and a stability of a coil shape regarding an optical fiber laser in accordance with the Comparative examples 1 to 5.

FIG. 13 is a diagram showing a characteristic of a thermo conductive molding body and a retentivity of a coil shape and a temperature of an optical fiber ($\Delta T$) regarding an optical fiber laser in accordance with the Examples 8 to 14.

FIG. 14 is a diagram showing a characteristic of a thermo conductive molding body and a retentivity of a coil shape and a temperature of an optical fiber ($\Delta T$) regarding an optical fiber laser in accordance with the Comparative examples 6 to 10.

DETAILED DESCRIPTION OF THE PREFERRED EMBODIMENTS

Here, each of embodiments which is embodied in accordance with the present invention will be described in detail below, with being based on the drawings. Moreover, in the description of each of the embodiments a duplicated description will be omitted with making use of a similar reference symbol for the similar part.

Next, each of the embodiments of the optical fiber holding apparatus in accordance with the present invention will be described in detail below, with reference to the drawings. However, the present invention is not to be limited to each of the embodiments.

The First Embodiment

Figure 1:
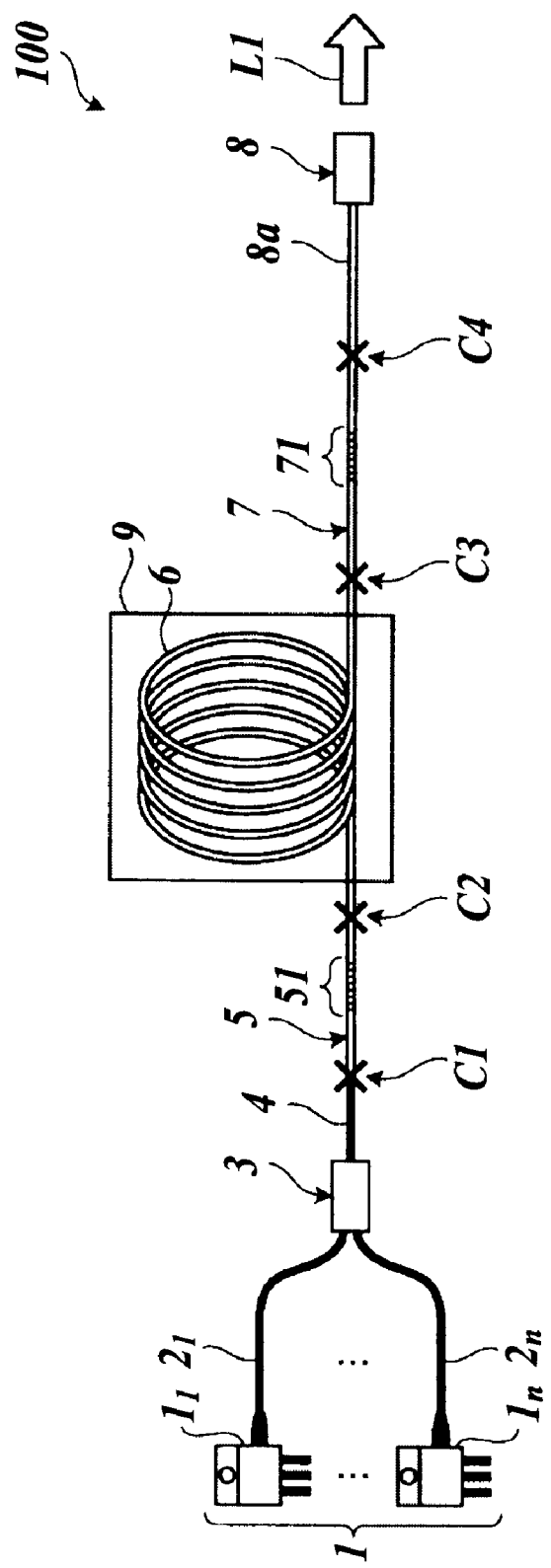
FIG. 1 is an exemplary drawing showing an optical fiber laser with making use of an optical fiber holding apparatus in accordance with the first embodiment.

Here, FIG. 1 is an exemplary drawing for showing an optical fiber laser (100) with making use of an optical fiber holding apparatus regarding the first embodiment in accordance with the present invention. And then as showing in FIG. 1, this optical fiber laser (100) comprises: an excitation light source (1) in which a semiconductor laser from ($1_1$) to ($1_n$) (of which the (n) is an integer which is larger than or equal to one) is provided, that is a multimode semiconductor laser, from which an exciting light is to be output of which a wave length is 975±5 nanometers; a multimode optical fiber from ($2_1$) to ($2_n$); a tapered fiber bundle (TFB) (3); a multimode optical fiber (4); an optical fiber grating (5) in which a grating part (51) is formed that has a structure of which an index of refraction changes as periodically; an amplifying optical fiber (6); an optical fiber grating (7) in which a grating part (71) is formed; and an output terminal (8), such as an optical connector or the like, which comprises a single mode optical fiber (8a). Moreover, this optical fiber laser (100) further comprises: a holding apparatus (9) for the amplifying optical fiber (6).

And then the multimode optical fiber from ($2_1$) to ($2_n$) is connected in order to perform a wave guiding of an exciting light which is to be output from the semiconductor laser from ($1_1$) to ($1_n$). Further, the TFB (3) is configured in order to perform a coupling of each of the exciting lights which is wave guided by the corresponding multimode optical fiber from ($2_1$) to ($2_n$) respectively, and then in order to output from the multimode optical fiber (4). Still further, the optical fiber grating (5) is fusion spliced to the multimode optical fiber (4) at a connecting point (C1). Still further, the amplifying optical fiber (6) is fusion spliced to the optical fiber grating (5) at the connecting point (C2). Still further, the optical fiber grating (7) is fusion spliced to the multimode optical fiber (6) at a connecting point (C3). Furthermore, the single mode optical fiber (8a) of the output terminal (8) is fusion spliced to the optical fiber grating (7) at a connecting point (C4).

Figure 2:
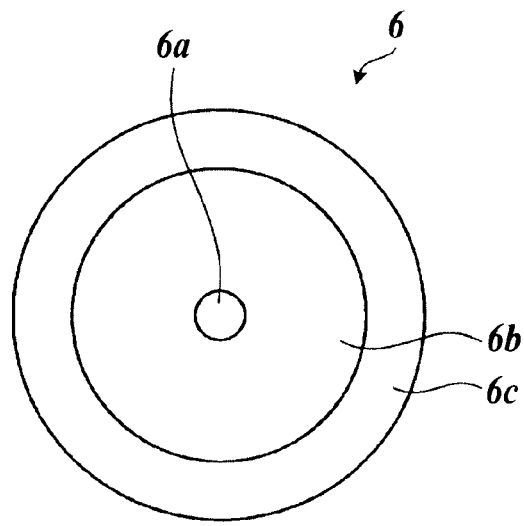
FIG. 2 is a cross sectional view exemplary showing a cross section which is vertical to a longitudinal direction of an amplifying optical fiber that is shown in FIG. 1.

Here, FIG. 2 is a cross sectional view for exemplary showing a cross section which is vertical to a longitudinal direction of the amplifying optical fiber (6) that is shown in FIG. 1. And then this amplifying optical fiber (6) is an amplifying optical fiber of the double cladding type that comprises: a core part (6a) which is formed of a silica glass to which erbium (Er) and ytterbium (Yb) are added together as the optical amplification medium; an inner side cladding part (6b), which is formed of a silica glass at a periphery of the core part (6a), and which has an index of refraction to be lower than that of the core part (6a); and an outer side cladding part (6c), which is formed of a resin at a periphery of the inner side cladding part (6b), and which has an index of refraction to be lower than that of the inner side cladding part (6b). Moreover, an outside diameter of the amplifying optical fiber (6) is designed to be such as 250 micrometers or the like.

Further, the optical fiber grating (5) comprises a cross sectional structure which is similar to that in accordance with the amplifying optical fiber (6) as well. And then the same is an optical fiber of the double cladding type in which germanium is added into a core part. Still further, the optical fiber grating (7) is not the double cladding type, and then the same comprises a configuration, in which the cladding part that is comprised of the inner side cladding part (6b) and of the outer side cladding part (6c) in accordance with the structure of the amplifying optical fiber (6) which is shown in FIG. 2 is replaced to a cladding part of one layer, and then a resin coating film layer is provided at a periphery of this cladding part in order to perform a protection of a glass part of the optical fiber.

Still further, the single mode optical fiber (8a) is designed to comprise a configuration which is similar to that in accordance with the optical fiber grating (7) as well. Still further, each of the multimode optical fiber from ($2_1$) to ($2_n$) and the (4) comprises a normal configuration in which a core part and a cladding part are provided. And then each of those is a multimode optical fiber of which a core diameter of the core part is to be such as 105 micrometers or the like, respectively. Still further, each of those is designed to be configured for a light which has a wave length of the exciting light in order to perform a propagation in a multimode. Still further, for the multimode optical fiber (4) it may be available to make use of an optical fiber of the double cladding type.

Still further, each of the grating part (51) and the (71) which is formed at the corresponding optical fiber grating (5) and the (7) is designed to have such as a pitch or the like to be set up in order to have a predetermined wave length within a light emission band of Er which is the optical amplification medium to be added into the core part (6a) of the amplifying optical fiber (6), such as a reflection band of which a wave length is central at a vicinity of 1556 nanometers, respectively. Furthermore, a reflecting power at the maximum of the grating part (51) is approximately 100 percent, and in the meantime, the reflecting power at the maximum of the grating part (71) is approximately between ten percent and thirty percent.

Figure 3:
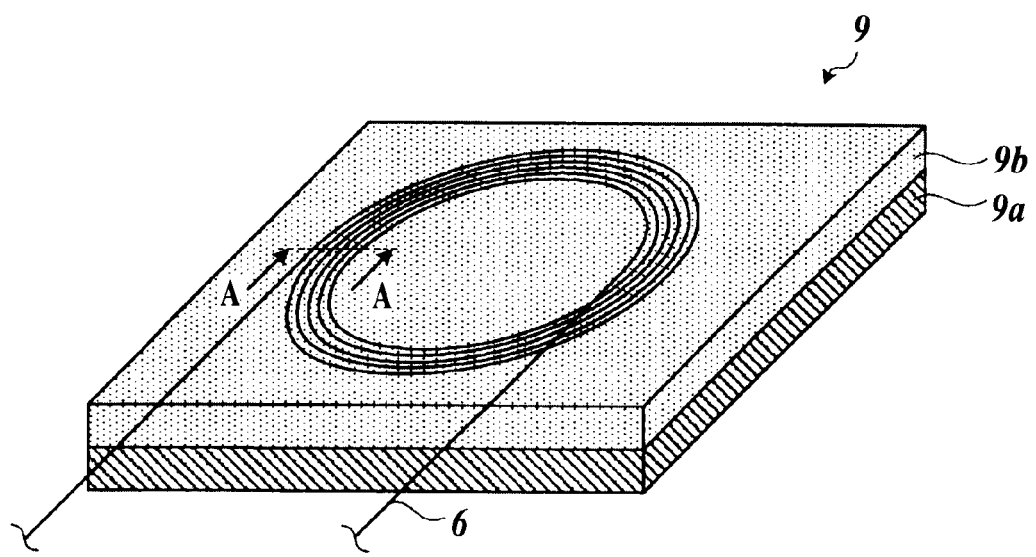
FIG. 3 is a diagonal view exemplary showing the holding apparatus which is shown in FIG. 1.

Next, regarding the holding apparatus (9) will be described in detail below. FIG. 3 is a diagonal view for exemplary showing the holding apparatus (9) which is shown in FIG. 1. And then this holding apparatus (9) comprises: a base substance (9a) which is formed of a metal, such as aluminum or the like; and a thermo conductive molding body (9b) of a sheet shape which is formed as sticking fast to cover at least a part of an upper face of the base substance (9a). Moreover, a thickness of the thermo conductive molding body (9b) is such as between 0.5 millimeter and ten millimeters or the like. Further, the holding apparatus (9) is designed to be mounted on to a housing of this optical fiber laser (100). Or, a part of this housing is designed to be combined with the base substance (9a). And then this holding apparatus (9) is designed to hold the amplifying optical fiber (6) which is to be a state of which is rolled up so as not to overlap with each other at a surface of the thermo conductive molding body (9b).

Next, an operation of this optical fiber laser (100) will be described in detail below. And in the first instance, an exciting light is output from the semiconductor laser from ($1_1$) to ($1_n$) with having a wave length of 975±5 nanometers, respectively. And then each of the exciting lights is wave guided at the multimode optical fiber from ($2_1$) to ($2_n$), respectively. Moreover, each of the exciting lights which is wave guided is coupled at the TFB (3), and then the same is output therefrom to the multimode optical fiber (4). Further, the exciting light which is coupled is propagated as a multimode through the multimode optical fiber (4). And then thereafter the exciting light which is propagated through the multimode optical fiber (4) is to be transmitted through the optical fiber grating (5), and then the same is to be reached the amplifying optical fiber (6).

Still further, the exciting light which is reached to the amplifying optical fiber (6) is propagated as the multimode through the inner side cladding part (6*b*) of the amplifying optical fiber (6), and the same performs a photoexcitation of Er via the Yb which is added into the core part (6*a*) of the amplifying optical fiber (6) as well. And hence a fluorescence is emitted which has a band of wave length including the wave length of 1560 nanometers. Still further, this fluorescence is amplified due to a function of a stimulated emission of Er at a period of going and coming back as a single mode at an inner side of an optical cavity that the optical fiber grating (5) and the (7) configure. And hence a laser oscillation is performed with having a emission wave length of 1560 nanometers. And thus in accordance with the optical fiber laser (100) a laser beam (L1) is to be outputted from the output terminal (8) with having the intensity of the light to be such as 100 watts or the like.

Still further, there are existing the exciting light and the light of the laser oscillation in the amplifying optical fiber (6), and hence the intensity of the light becomes to be stronger as extremely. And then therefore the amplifying optical fiber (6) becomes to perform the heat generation due to the optical loss therein. Still further, in the case of the amplifying optical fiber (6) a conversion from the exciting light to the light of the laser oscillation is performed therein with a predetermined energy conversion efficiency. And then therefore the energy which is lost at the period of the conversion becomes to be a heat. And hence it becomes to be easier for the same in particular to perform the heat generation.

However, in accordance with this optical fiber laser (100) the amplifying optical fiber (6) is held by the holding apparatus (9) at the state of which is rolled up on to the thermo conductive molding body (9*b*) which has the thermal conductivity to be higher than or equal to 0.5 W/mK, and which has the Asker C hardness to be between twenty and fifty. And then as a result, the amplifying optical fiber (6) is held so as not to generate the optical loss as excessively due to a bending, and hence an excessive heat is not to be generated therefrom, and the heat which is generated becomes to be heat radiated as promptly as well. And then therefore a temperature rise of the amplifying optical fiber (6) becomes to be suppressed, the decrease in the energy conversion efficiency becomes to be prevented, and the reliability becomes to be maintained as well.

Figure 4:
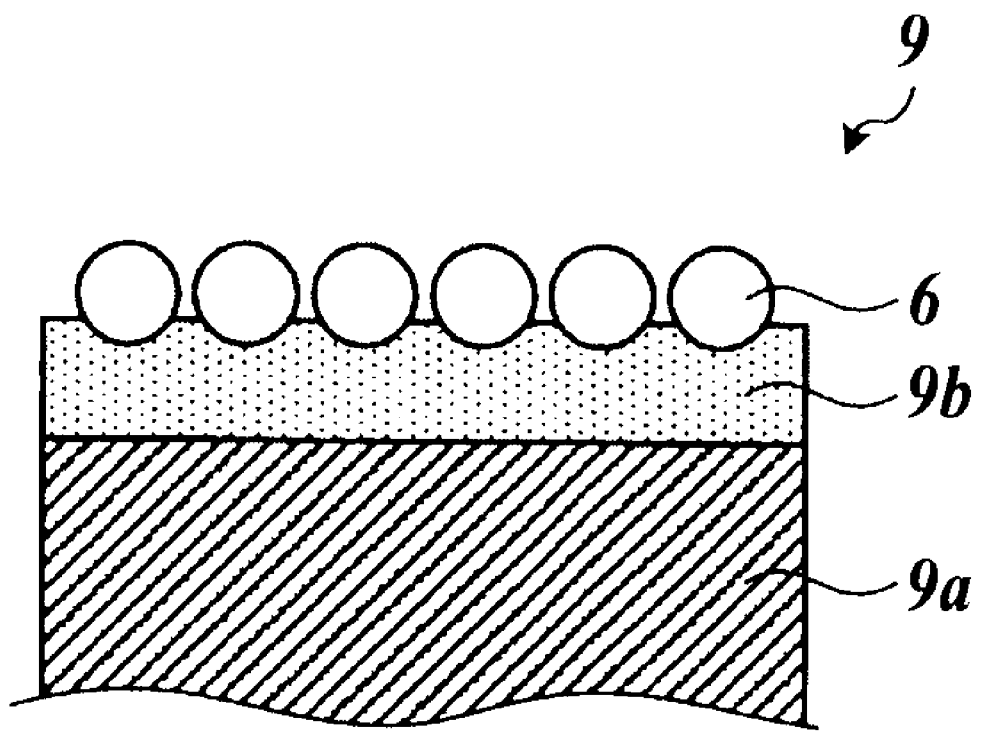
FIG. 4 is a cross sectional view on the A-A line showing the holding apparatus which is shown in FIG. 3.

Here, FIG. 4 is a cross sectional view on the A-A line for showing the holding apparatus which is shown in FIG. 3. And then as showing in FIG. 4, in accordance with the holding apparatus (9) the amplifying optical fiber (6) is designed to be submerged with a proper amount into the thermo conductive molding body (9*b*) which has the hardness in a proper degree. And then the same is held as a state of which such as any slight bending or the like is not to be occurred. And hence the same becomes to be the one in which there is not to be generated any excessive optical loss, such as a bend loss or the like. Moreover, the heat which is generated in the amplifying optical fiber (6) becomes to be heat radiated as promptly because of the higher thermal conductivity of the thermo conductive molding body (9*b*). Further, in accordance with this holding apparatus (9) it becomes able to prevent from the bend loss due to any overlap of the amplifying optical fiber (6), because the amplifying optical fiber (6) is designed to be held at the state of which is rolled up as a concentric circular shape so as not to overlap with each other.

Still further, in an optical fiber in general a core body is formed of a silica glass as mainly, and then the same has an elasticity with a certain degree. Still further, an optical fiber is rolled up to such as a bobbin or a drum or the like at a period of processing of production, and then the same is to be stored till a next usage under the state. And then due to this kind of the storage state or the period of time such as a stress or a strain or the like at the period of performing the rolling of which the resin coating film layer at the periphery of the optical fiber is effected as mainly becomes to be relaxed. And hence a case becomes to be occurred several times in which a kind of "rolled kink" is remained. And then in accordance with such as the optical fiber laser or the like even in a case where the optical fiber is to be held at the state of which is rolled up as the concentric circular shape in order to house into the housing of the apparatus, the optical fiber cannot help but become to be collapsed from the desired shape in response to such as an elasticity or the rolled kink or the like of the optical fiber itself. And then therefore in a case of performing the heat radiation of the optical fiber with making use of the thermo conductive molding body a kind of cohesiveness is required in order to settle the optical fiber to be a desirable shape for the thermo conductive molding body so as to prevent from this kind of collapsing of the shape.

In the meantime however, in the case of the conventional thermo conductive molding body such as the hardness or an amount of the strain or the like is not proper in a case of being effected a compressive stress because the same contains a thermo conductive filler with a large quantity. And hence it is not able to desire the cohesiveness in order to fix the above mentioned optical fiber. Or, it may be possible to invent a method so as to fix an optical fiber by providing an adhesive layer on to a surface of the conventional thermo conductive molding body. However, it is not able to give a thermal conductivity as sufficiently to the adhesive layer which has a cohesion to be higher than or equal to a certain degree. And hence the thermal conductivity cannot help but become to be decreased.

And in the meantime, it may be possible to invent a method so as to reduce the hardness of the thermo conductive molding body and to decrease as excessively an impact resilience against the compression. However, in a case where an optical fiber is held on to a thermo conductive molding body which does not have the hardness as properly and an amount of strain against the compressive stress, there may not be occurred any collapse of the shape, in the meantime however, there may be a concern of which the bend loss may be occurred in the optical fiber because a localized bending becomes to be occurred as easily on to the optical fiber at the period of performing a molding of the coil state or of performing an assembly of the apparatus, and then because the same is held with a remaining of the bending.

On the contrary however, in accordance with the present first embodiment it becomes able to realize the holding of the amplifying optical fiber (6) at the state of which there is not occurred such as any slight bending or the like, and it becomes able to ensure the heat dissipation as sufficiently, with making use of the thermo conductive molding body (9b) which has the thermal conductivity to be higher than or equal to 0.5 W/mK, and which has the Asker C hardness to be between twenty and fifty in accordance with the holding apparatus (9).

Moreover, it is preferable for the characteristic of the thermo conductive molding body (9b) to have a compressive strength of which a peak value is between ten and thirty N/cm² and a stabilized value is between three and ten N/cm². Further, it is preferable for the same to have the thermal conductivity to be higher than or equal to 1.0 W/mK, to have the Asker C hardness to be between twenty-five and forty. Still further, it is further preferable for the same to have the thermal conductivity to be higher than or equal to 1.5 W/mK, to have the Asker C hardness to be between twenty-five and thirty-five, and to have the compressive strength of which the peak value is between fifteen and twenty-five N/cm².

Furthermore, it is able to perform a production of the thermo conductive molding body (9b) which has the above mentioned characteristics, by performing an addition of a thermo conductive filler, such as an aluminum oxide, a magnesium oxide, a boron nitride, an aluminum nitride, an aluminum hydroxide, a magnesium hydroxide, or the like, into a base rubber which is to contain the same with a predetermined quantity in which such as an acrylic rubber and a thermoplastic elastomer and the like are mixed with a predetermined compounding ratio, and then by performing the molding of the thermo conductive composition of matter into a sheet shape as desired in which a softening agent is designed to be contained as properly.

And thus as described above, with making use of the holding apparatus (9) in accordance with the present first embodiment it becomes able to obtain the heat dissipation to be higher, and it becomes able to hold the amplifying optical fiber (6) as well with the optical loss to be lower.

Examples 1 to 7, Comparative Examples 1 to 5

Next, the present invention will be described in further detail below, with being based on Examples and Comparative examples. However, the present invention is not to be limited any of these.

Here, as Examples from 1 to 7 and Comparative examples from 1 to 5 in accordance with the present invention an optical fiber laser is manufactured that has a configuration which is similar to that is shown in FIG. 1. And then in this case a holding apparatus is designed to be a substance of which a thermo conductive molding body which has a sheet shape with having a thickness of three millimeters is attached on to a surface of a base substance of a plate shape which is formed of aluminum. Moreover, an amplifying optical fiber which has a length of twenty meters is to be at a state of which is rolled up to be a concentric circular shape on to this holding apparatus. And then the amplifying optical fiber is fixed on to the thermo conductive molding body by performing an application of a predetermined pressure as uniformly. Further, the optical fiber laser is configured, for an intensity of an exciting light which is outputted from each of the semiconductor lasers of eighteen pieces so as to be set up to be ten watts, and for an intensity of a laser light which is outputted from an output terminal so as to be set up to be 100 watts.

Still further, for each of the Examples and for each of the Comparative examples each of thermo conductive molding bodies is made use which has a different composition from each other, respectively. And then each of the thermal conductivity, the Asker C hardness and the compressive strength is designed to be different from each other, respectively. As more specifically, at least one nature as a thermo conductive filler which is selected from a group of an aluminum oxide (A) which has a shape to be spheroidal and has an average grain diameter to be thirty-five micrometers, an aluminum oxide (B) which has a shape to be round and has an average grain diameter to be twenty-two micrometers and a aluminum hydroxide which has a shape to be indeterminate and has an average grain diameter to be eight micrometers, is mixed with a predetermined parts by mass with corresponding to 100 parts by mass of a base rubber in which a compounding ratio between an acrylic rubber and a thermoplastic elastomer is different therefrom. Still further, as a softening agent an oil (A) as an oil of a polyether ester system and an oil (B) as an oil of a paraffinic system are mixed with a predetermined parts by mass. And then by kneading and mixing those together a thermo conductive rubber composition of matter is produced. Still further, by pushing out the thermo conductive rubber composition of matter to be a sheet form which has a thickness of three millimeters by making use of an extruding machine so as to obtain a thermo conductive molding body. And thus this substance is made use.

Still further, each of the thermal conductivity, the Asker C hardness and the compressive strength is measured as follows for the thermo conductive molding body which is produced in such a manner. And then in the first instance, the thermal conductivity is measured, with being pursuant to the hot wire method which is specified in accordance with the JIS R 2616, by making use of the Quick Thermal Conductivity Meter which is produced by Kyoto Electronics Manufacturing Co., Ltd., at a state of which two sheets of the thermo conductive molding bodies are overlapped together to be in a two-ply form with having a thickness of six millimeters that individually corresponds to each of the Examples and of the Comparative examples. Still further, the Asker C hardness is measured by making use of a hardness meter of the Asker C type which is produced by KOBUNSHI KEIKI CO., LTD.

Still further, regarding the compressive strength the thermo conductive molding body in accordance with each of the Examples and of the Comparative examples is produced to have a dimensions of three millimeters times twenty millimeters times twenty millimeters, respectively. And then each of the samples is compressed by making use of a compression tester on the market with a speed of five millimeters per minute. And then each of the measurements are performed for each of the samples respectively, for a peak value at the time of compressing thirty percent of the thickness and for a stabilized value at the time of elapsing ten minutes with maintaining the condition.

And then thereafter each of the evaluations are performed for the produced optical fiber laser in accordance with each of the Examples and of the Comparative examples that will be described in detail below.

(Temperature of an Optical Fiber (ΔT))

Here, a temperature of an optical fiber (ΔT) is defined to be a difference of temperature between a temperature which is the highest in a range of vision of a thermograph and a room temperature in a case where a temperature distribution of an amplifying optical fiber is observed from an outer side by making use of the thermography (the Thermotracer TH9260) which has the function of switching between visible and infrared and which is produced by NEC Avio Infrared Technologies Co., Ltd.

(Stability of a Coil Shape)

Here, a stability of a coil shape is defined to be at a state whether or not maintain an initial arrangement of the coil shape as the concentric circular shape for an amplifying optical fiber which is arranged to be as shown in FIG. 3 and in FIG. 4. And then the evaluation for this matter is executed by performing a visual observation of a state of an amplifying optical fiber for every predetermined amount of elapsed time and then by confirming whether or not exist a displacement (movement) from the initial arrangement.

(Results)

Here, FIG. 5 is a diagram for showing a characteristic of a thermo conductive molding body and a temperature of an optical fiber (ΔT) and a stability of a coil shape regarding an optical fiber laser in accordance with the Examples from 1 to 7. And then as showing in FIG. 5, in accordance with the Examples from 1 to 7 the thermal conductivity of the thermo conductive molding body becomes to be higher than or equal to 0.5 W/mK, and the Asker C hardness becomes to be between twenty and fifty as well. And hence it becomes able to suppress the temperature of the optical fiber to be lower. Moreover, in accordance with the Examples 3 and the 4 the thermal conductivity becomes to be higher than or equal to 1.0 W/mK. And hence it becomes able to suppress the temperature rise of the optical fiber to be lower. Further, in accordance with the Examples from 5 to the 7 the thermal conductivity becomes to be higher than or equal to 1.5 W/mK. And hence it becomes able to suppress the temperature rise of the optical fiber to be further lower. Still further, in accordance with the Examples from 4 to the 7 the Asker C hardness becomes to be between twenty-five and forty which is within the further preferable range. Still further, the peak value of the compressive strength becomes to be between fifteen and twenty-five N/cm$^2$ which is within the further preferable range. And hence it becomes able to obtain the cohesiveness to be at the optimum state at the period of holding the optical fiber. And then it is considered that this point may contribute as well to suppress the temperature of the optical fiber. Furthermore, regarding the stability of the coil shape in accordance with each of the Examples it cannot be found out any displacement from the initial arrangement of the amplifying optical fiber even after elapsing time of 240 hours. That is to say, the shape of the coil is stable.

And in the meantime, FIG. 6 is a diagram for showing a characteristic of a thermo conductive molding body and a temperature of an optical fiber (ΔT) and a stability of a coil shape regarding an optical fiber laser in accordance with the Comparative examples from 1 to 5. And then as showing in FIG. 5, in accordance with the Comparative examples 1 and the 2 the thermal conductivity of each of the thermo conductive molding bodies is not sufficient. And hence the temperature of the amplifying optical fiber becomes to be raised as uniformly, respectively, that is to say, the temperature of the optical fiber (ΔT) becomes to be increased. In accordance with the Comparative example 2 in particular, the temperature of the optical fiber (ΔT) achieves to be +70° C. And then in a case of using under this state it can be predicted that it becomes a cause of a deterioration of the outer side cladding layer of the amplifying optical fiber, and hence it becomes a cause of a decrease of a lifetime of the apparatus in its turn. Moreover, in accordance with the Comparative example 5 the thermo conductive molding body becomes to be soft as excessively. And hence the localized bending becomes to be occurred on the amplifying optical fiber. And then the large amount of the temperature rise, that is to say, the increase of the temperature of the optical fiber (ΔT) becomes to be occurred at that part. Further, in accordance with the Comparative examples 3 and the 4 regarding the stability of the coil shape the arrangement of the fiber cannot help but become to be collapsed the coil shape. And hence it becomes to be the result of which the measurement of the temperature of the optical fiber (ΔT) have to be suspended. On the contrary however, in accordance with the Comparative examples 1, the 2 and the 5 it is not able to find out any of the displacement from the initial arrangement of the amplifying optical fiber for any of those Comparative examples. That is to say, the shape of the coil is stable.

Modified Examples

Here, a holding apparatus which is available to be made use for the above described first embodiment is not to be limited to that is shown in FIG. 1. And then the modified examples of the holding apparatus that are individually available to make use for the fist embodiment will be described in detail below.

Modified Example 1

Figure 7:
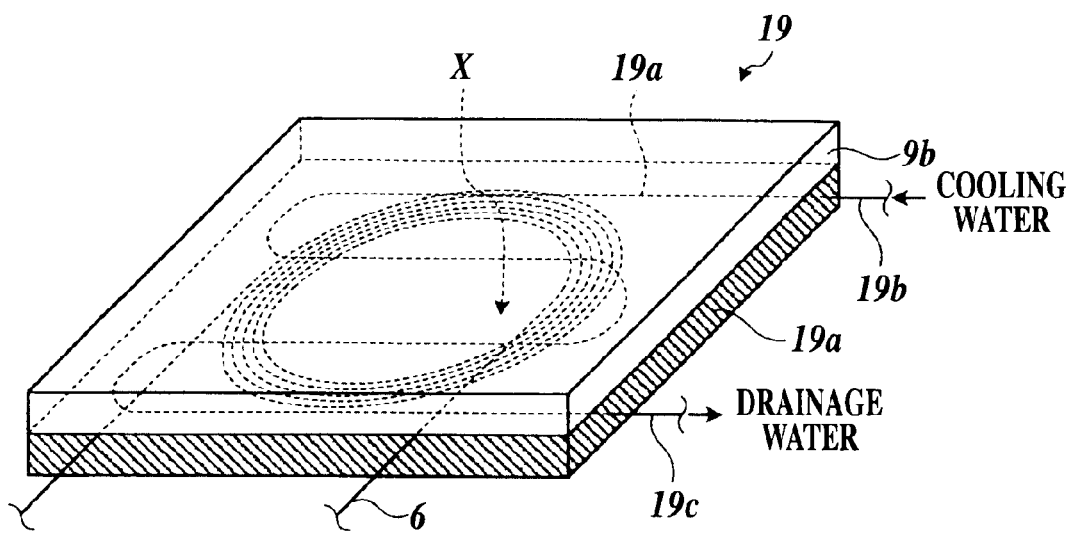
FIG. 7 is a diagonal perspective view exemplary showing a holding apparatus in accordance with the Modified example 1.

Here, FIG. 7 is a diagonal perspective view for exemplary showing a holding apparatus in accordance with the Modified example 1. And then as showing in FIG. 7, a holding apparatus (19) in accordance with the Modified example 1 comprises a base substance (19a) which is formed of a metal, such as aluminum or the like, and a thermo conductive molding body (9b), which is similar to that in accordance with the holding apparatus (9) which is shown in FIG. 1. In the meantime however, in accordance with this holding apparatus (19) pipe arrangements from (19b) to (19d) are set as a cooling unit at the base substance (19a), which is different from that in accordance with the holding apparatus (9). Moreover, in accordance with this holding apparatus (19) an amplifying optical fiber (6) is designed to be held that becomes to be at a state of which is rolled up to be a concentric circular shape so as not to overlap with each other with being sandwiched between a surface of the thermo conductive molding body (9b) and a surface of the base substance (19a). Further, the amplifying optical fiber (6) is designed to be submerged into the thermo conductive molding body (9b) which has a hardness to be moderate. And then therefore the base substance (19a) and the thermo conductive molding body (9b) become to be at a state to be adhered to each other.

Still further, one end of each of the pipe arrangements (19b) and the (19c) is connected to a water supply and drainage mechanism of such as a pump or the like which is arranged at an outer side, and in the meantime, the other end is connected to the pipe arrangement (19d). Still further, the pipe arrangement (19d) is designed to be arranged all over an inner side of the base substance (19a). And then in accordance with the pipe arrangement (19b) a cooling water which is supplied from the water supply and drainage mechanism becomes to be introduced into the pipe arrangement (19d). And then in accordance with the pipe arrangement (19d) the cooling water becomes to be flowed through the inner side of the base substance (19a). And then in accordance with the pipe arrangement (19b) the cooling water becomes to be drained from the pipe arrangement (29d) to the water supply and drainage mechanism. And then in this case because of the cooling water which is flowing through the pipe arrangement (19d) the thermo conductive molding body (9b) becomes to be cooled down. And hence the heat which is generated in the amplifying optical fiber (6) becomes to be radiated as further promptly. Still further, it may be available to make use of a cooling medium, such as a coolant or the like, in the place of the cooling water.

Still further, the amplifying optical fiber (6) is designed to be at the state of which is rolled up so as not to be overlapped to each other. In the meantime however, regarding a part which is to be taken out to an outer side an overlapping becomes to be occurred with the other part which is at the state of being rolled up (the part which is shown in FIG. 7 with making use of the reference symbol (X)). However, this overlapping is quite little. And also the amplifying optical fiber (6) is designed to be submerged into the thermo conductive molding body (9b). And then therefore the bend loss due to the overlapping of the amplifying optical fiber (6) at this part (X) is quite insignificant, and hence it is able to be negligible.

Still further, in accordance with this Modified example 1 the thermo conductive molding body (9b) has an area which is equal to that of the base substance (19a). And then therefore the same becomes to have the heat dissipation to be higher, and then it is preferable. However, in accordance with the thermo conductive molding body (9b) if the same has a shape so as to cover the amplifying optical fiber (6) it is sufficient from a point of view of the retentivity and of the heat dissipation. And then therefore for a thermo conductive molding body it may be available to make use of such as a substance which has a doughnut shape which is to have a good match with a shape of a region of which the amplifying optical fiber (6) is placed.

Modified Example 2

Figure 8:
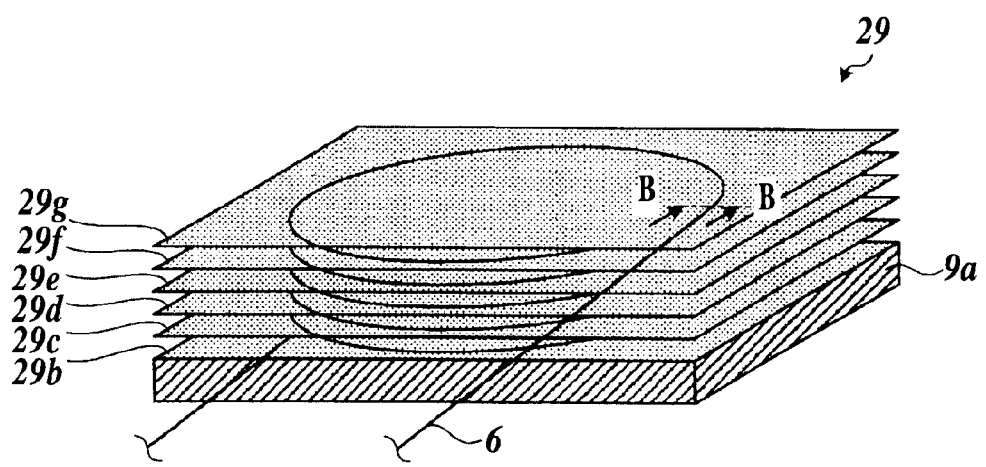
FIG. 8 is a diagonal view exemplary showing a holding apparatus in accordance with the Modified example 2.

Here, FIG. 8 is a diagonal view for exemplary showing a holding apparatus in accordance with the Modified example 2. And then as showing in FIG. 8, in a holding apparatus (29) in accordance with the Modified example 2 a plurality of thermo conductive sheets from (29b) to (29g) that are individually thermo conductive molding bodies are designed to be accumulated and then to be formed on to an upper surface of a base substance (9a), respectively. And then in accordance with each of a plurality of the thermo conductive sheets from (29b) to the (29g) the thermal conductivity becomes to be higher than or equal to 0.5 W/mK, and the Asker C hardness becomes to be between twenty and fifty as well respectively, which is similar to that of the thermo conductive molding body (9b) in accordance with the first embodiment.

Figure 9:
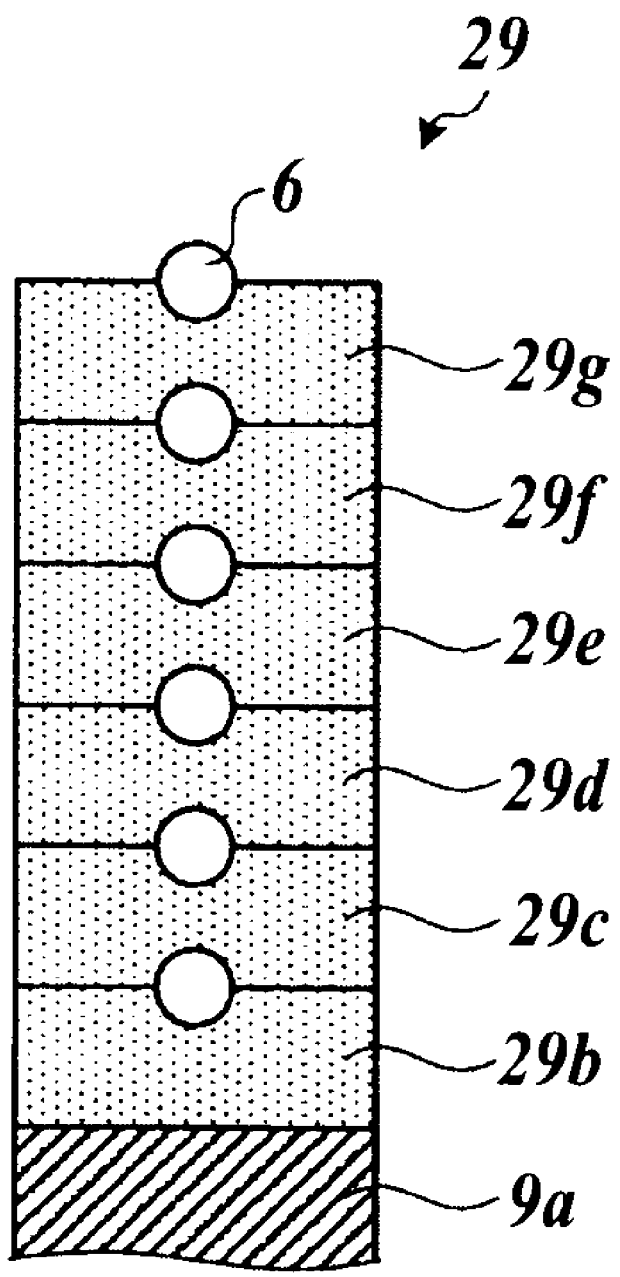
FIG. 9 is a cross sectional view on the B-B line showing the holding apparatus which is shown in FIG. 8.

And in the meantime, FIG. 9 is a cross sectional view on the B-B line for showing the holding apparatus (29) which is shown in FIG. 8. And then as showing in FIG. 9, in accordance with this holding apparatus (29) the amplifying optical fiber (6) is designed to be held by being sandwiched between a face of each of the thermo conductive sheets from (29b) to the (29g) that is facing to each other. Moreover, the amplifying optical fiber (6) is designed to be submerged into the thermo conductive sheets from (29b) to the (29g) that individually have the hardness to be moderate. And then therefore each of the thermo conductive sheets from (29b) to the (29g) becomes to be at a state to be adhered to each other. Further, the amplifying optical fiber (6) is designed to be at a state of which is rolled up to be single for the same between each of the thermo conductive sheets from (29b) to the (29g). And then therefore each of the amplifying optical fibers (6) becomes to be held so as not to be overlapped with each other. And hence in accordance with this type of the holding apparatus (29) it becomes able to obtain the heat dissipation to be higher, and it becomes able to hold the optical fiber with having the optical loss to be lower as well.

Moreover, in accordance with the above described first embodiment and with the Modified example 2 it may be available to replace the base substance (9a) with the base substance (19a) in accordance with the Modified example 1 in which each of the pipe arrangements from (19b) to the (19d) is set. Further, for a cooling unit it is not to be limited to the example of which both of the pipe arrangements from (19b) to the (19d) and the cooling water are made use together in accordance with such as the Modified example 1. And then it may be available to set such as a Peltier element or the like at an outer surface of a holding apparatus and then to make use the same as a cooling unit.

Still further, in accordance with each of the above described embodiments and with each of the corresponding Modified examples the holding apparatus is designed so as to hold the amplifying optical fiber. However, an optical fiber which is to be held is not to be limited to any of those. For example, a nonlinear optical fiber can be made use for inputting a light which has an intensity to be higher, in which a four wave mixing is made use as the nonlinear optical effect, and the zero dispersion wavelength characteristic is to be made use that has a temperature dependency. And then therefore if the holding apparatus in accordance with the present invention is applied to an optical fiber it becomes able to prevent the zero dispersion wavelength from a fluctuation. And hence it becomes able to prevent an efficiency of the occurrence of the four wave mixing from decreasing. Furthermore, it becomes able to maintain the reliability of the nonlinear optical fiber and of the apparatus in which the same is to be made use.

The Second Embodiment

Figure 10:
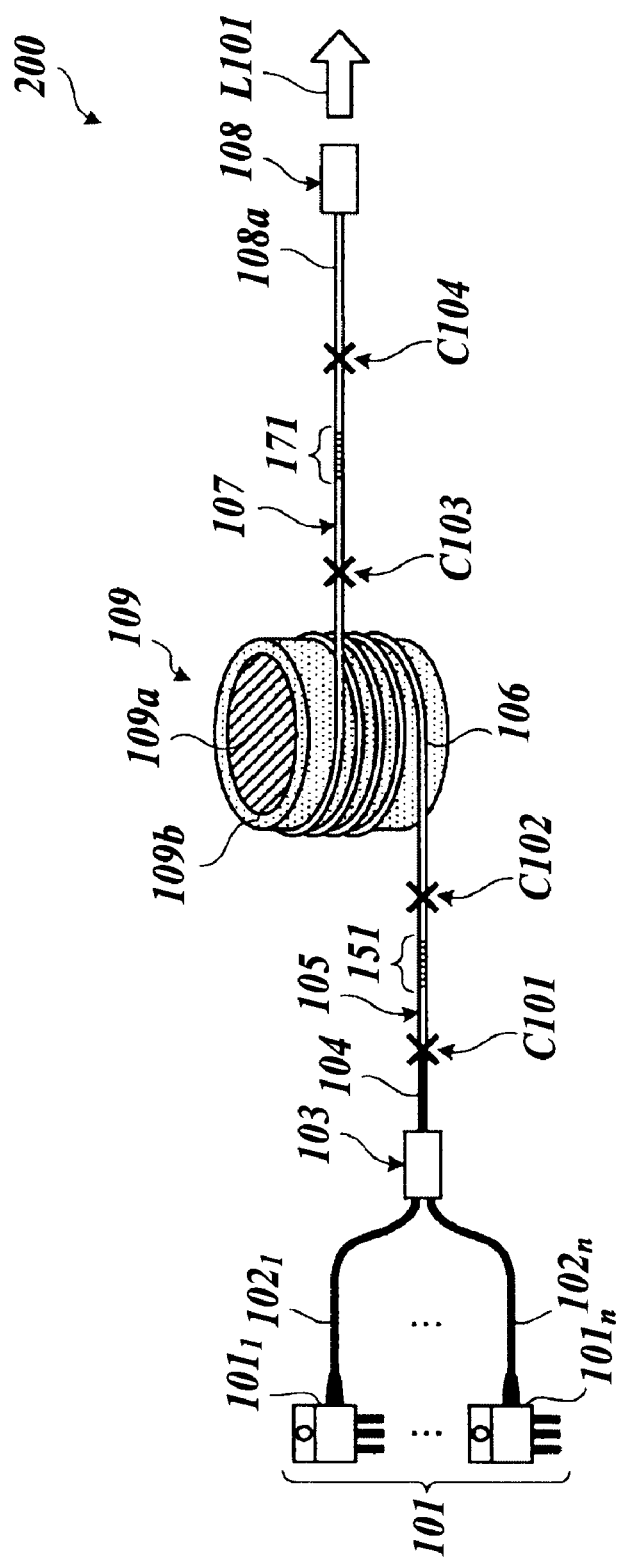
FIG. 10 is an exemplary drawing showing an optical fiber laser with making use of an optical fiber holding apparatus in accordance with the second embodiment.

Here, FIG. 10 is an exemplary drawing for showing an optical fiber laser with making use of an optical fiber holding apparatus in accordance with the second embodiment. And then as showing in FIG. 10, this optical fiber laser (200) comprises: an excitation light source (101) in which a semiconductor laser from ($101_1$) to ($101_n$) (of which the (n) is an integer which is larger than or equal to one) is provided, that is a multimode semiconductor laser, from which an exciting light is to be output of which a wave length is 975±5 nanometers; a multimode optical fiber from ($102_1$) to ($102_n$); a tapered fiber bundle (TFB) (103); a multimode optical fiber (104); an optical fiber grating (105) in which a grating part (151) is formed that has a structure of which an index of refraction changes as periodically; an amplifying optical fiber (106); an optical fiber grating (107) in which a grating part (711) is formed; and an output terminal (108), such as an optical connector or the like, which comprises a single mode optical fiber (108a). Moreover, this optical fiber laser (200) further comprises: a holding apparatus (109) for the amplifying optical fiber (106).

And then the multimode optical fiber from ($102_1$) to ($102_n$) is connected in order to perform a wave guiding of an exciting light which is to be output from the semiconductor laser from ($101_1$) to ($101_n$). Further, the TFB (103) is configured in order to perform a coupling of each of the exciting lights which is wave guided by the corresponding multimode optical fiber from ($102_1$) to ($102_n$) respectively, and then in order to output from the multimode optical fiber (104). Still further, the optical fiber grating (105) is fusion spliced to the multimode optical fiber (104) at a connecting point (C101). Still further, the amplifying optical fiber (106) is fusion spliced to the optical fiber grating (105) at the connecting point (C102). Still further, the optical fiber grating (107) is fusion spliced to the multimode optical fiber (106) at a connecting point (C103). Furthermore, the single mode optical fiber (108a) of the output terminal (108) is fusion spliced to the optical fiber grating (107) at a connecting point (C104).

Figure 11:
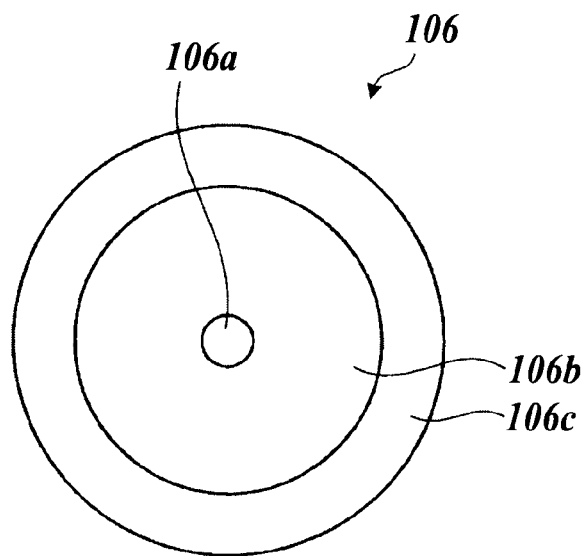
FIG. 11 is a cross sectional view exemplary showing a cross section which is vertical to a longitudinal direction of an amplifying optical fiber that is shown in FIG. 10.

Here, FIG. 11 is a cross sectional view for exemplary showing a cross section which is vertical to a longitudinal direction of an amplifying optical fiber (106) that is shown in FIG. 10. And then this amplifying optical fiber (106) is an amplifying optical fiber of the double cladding type that comprises: a core part (106a) which is formed of a silica glass to which erbium (Er) and ytterbium (Yb) are added together as the optical amplification medium; an inner side cladding part (106b), which is formed of a silica glass at a periphery of the core part (106a), and which has an index of refraction to be lower than that of the core part (106a); and an outer side cladding part (106c), which is formed of a resin at a periphery of the inner side cladding part (106b), and which has an index of refraction to be lower than that of the inner side cladding part (106b). Moreover, an outside diameter of the amplifying optical fiber (106) is designed to be such as 250 micrometers or the like.

Further, the optical fiber grating (105) comprises a cross sectional structure which is similar to that in accordance with the amplifying optical fiber (106) as well. And then the same is an optical fiber of the double cladding type in which germanium is added into a core part. Still further, the optical fiber grating (107) is not the double cladding type, and then the same comprises a configuration, in which the cladding part that is comprised of the inner side cladding part (106b) and of the outer side cladding part (106c) in accordance with the structure of the amplifying optical fiber (106) which is shown in FIG. 11 is replaced to a cladding part of one layer, and then a resin coating film layer is provided at a periphery of this cladding part in order to perform a protection of a glass part of the optical fiber.

Still further, the single mode optical fiber (108a) is designed to comprise a configuration which is similar to that in accordance with the optical fiber grating (107) as well. Still further, each of the multimode optical fiber from ($102_1$) to ($102_n$) and the (104) comprises a normal configuration in which a core part and a cladding part are provided. And then each of those is a multimode optical fiber of which a core diameter of the core part is to be such as 105 micrometers or the like, respectively. Still further, each of those is designed to be configured for a light which has a wave length of the exciting light in order to perform a propagation in a multimode. Still further, for the multimode optical fiber (104) it may be available to make use of an optical fiber of the double cladding type.

Still further, each of the grating part (151) and the (171) which is formed at the corresponding optical fiber grating (15) and the (107) is designed to have such as a pitch or the like to be set up in order to have a predetermined wave length within a light emission band of Er which is the optical amplification medium to be added into the core part (106a) of the amplifying optical fiber (106), such as a reflection band of which a wave length is central at a vicinity of 1556 nanometers, respectively. Furthermore, a reflecting power at the maximum of the grating part (151) is approximately 100 percent, and in the meantime, the reflecting power at the maximum of the grating part (171) is approximately between ten percent and thirty percent.

Still further, the holding apparatus (109) has a cylindrical shape, and then the same is configured by rolling up a thermo conductive molding body (109b) which has a sheet shape on to a periphery of a base substance (109a) which has a cylindrical shape and which is formed of a metal, such as aluminum or the like. Furthermore, a thickness of the thermo conductive molding body (109b) is designed to be such as between 0.5 millimeter and ten millimeters or the like. And then in accordance with the holding apparatus (109) the amplifying optical fiber (106) is designed to be held at a state of which is to be a coil shape by being rolled up to be single so as not to overlap with each other on to a peripheral surface which is formed of the thermo conductive molding body (109b).

Next, an operation of this optical fiber laser (200) will be described in detail below. And in the first instance, an exciting light is output from the semiconductor laser from ($101_1$) to ($101_n$) with having a wave length of 975±5 nanometers. And then each of the exciting lights is wave guided at the multimode optical fiber from ($102_1$) to ($102_n$). Moreover, each of the exciting lights which is wave guided is to be coupled at the TFB (103), and then the same is output therefrom to the multimode optical fiber (104). Further, the exciting light which is coupled is propagated as a multimode through the multimode optical fiber (104). And then thereafter the exciting light which is propagated through the multimode optical fiber (104) is to be transmitted through the optical fiber grating (105), and then the same is to be reached the amplifying optical fiber (106).

Still further, the exciting light which is reached the amplifying optical fiber (106) is to be propagated as the multimode through the inner side cladding part (106b) of the amplifying optical fiber (106), and the same performs a photoexcitation of Er via the Yb which is added into the core part (106a) of the amplifying optical fiber (106) as well. And hence a fluorescence is to be emitted which has a band of wave length including the wave length of 1560 nanometers. Still further, this fluorescence is amplified due to a function of a stimulated emission of Er at a period of going and coming back as a single mode at an inner side of an optical cavity that the optical fiber grating (105) and the (107) configure. And hence a laser oscillation is performed with having a emission wave length of 1560 nanometers. And thus in accordance with the optical fiber laser (200) a laser beam (L101) is to be outputted from the output terminal (108) with having the intensity of the light to be such as 100 watts or the like.

Still further, there are existing the exciting light and the light of the laser oscillation in the amplifying optical fiber (106), and hence the intensity of the light becomes to be stronger as extremely. And then therefore the amplifying optical fiber (106) becomes to perform the heat generation due to the optical loss therein. Still further, in the case of the amplifying optical fiber (106) a conversion from the exciting light to the light of the laser oscillation is performed therein with a predetermined energy conversion efficiency. And then therefore the energy which is lost at the period of the conversion becomes to be a heat. And hence it becomes to be easier for the same in particular to perform the heat generation.

However, in accordance with the optical fiber laser (200) the amplifying optical fiber (106) is held by the holding apparatus (109) at the state of which is rolled up on to the thermo conductive molding body (109b) which has the thermal conductivity to be higher than or equal to 0.5 W/mK, and which has the Asker C hardness to be between twenty and fifty. And then as a result, the amplifying optical fiber (106) is held so as not to generate the optical loss as excessively due to a bending, and hence an excessive heat is not to be generated therefrom, and the heat which is generated becomes to be heat radiated as promptly as well. And then therefore a temperature rise of the amplifying optical fiber (106) becomes to be suppressed, the decrease in the energy conversion efficiency becomes to be prevented, and the reliability becomes to be maintained as well.

Figure 12:
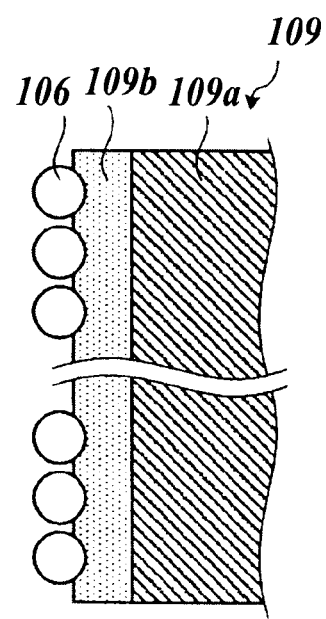
FIG. 12 is a cross sectional view exemplary showing a vicinity of a peripheral surface of the holding apparatus which is shown in FIG. 10.

Here, FIG. 12 is a cross sectional view for exemplary showing a vicinity of a peripheral surface of the holding apparatus (109) which is shown in FIG. 10. And then as showing in FIG. 12, in accordance with the holding apparatus (109) the amplifying optical fiber (106) is designed to be submerged with a proper amount into the thermo conductive molding body (109b) which has the hardness in a proper degree. And then the same is held as a state of which such as any slight bending or the like is not to be occurred. And hence the same becomes to be the one in which there is not to be generated any excessive optical loss, such as a bend loss or the like. Moreover, the heat which is generated in the amplifying optical fiber (106) becomes to be heat radiated as promptly because of the higher thermal conductivity of the thermo conductive molding body (109b). Further, in accordance with this holding apparatus (109) it becomes able to prevent from the bend loss due to any overlap of the amplifying optical fiber (106), because the amplifying optical fiber (106) is designed to be held at the state of which is rolled up so as not to overlap with each other. Still further, in accordance with this holding apparatus (109) it becomes able to hold the amplifying optical fiber (106) at the state of being rolled up with having a similar rolling diameter. And then therefore it becomes able to hold the same with having a size of the proposed room to be smaller than that in accordance with a case where the amplifying optical fiber (106) is held by being rolled up to be a concentric circular shape. Still further, it becomes able to avoid the bend loss which is to be occurred due to the overlap with the part that is at the state of being rolled up regarding a part of the amplifying optical fiber (106) which is to be taken out to an outer side.

Still further, in an optical fiber in general a core body is formed of a silica glass as mainly, and then the same has an elasticity with a certain degree. Still further, an optical fiber is rolled up to such as a bobbin or a drum or the like at a period of processing of production, and then the same is to be stored till a next usage under the state. And then due to this kind of the storage state or the period of time such as a stress or a strain or the like at the period of performing the rolling of which the resin coating film layer at the periphery of the optical fiber is effected as mainly becomes to be relaxed. And hence a case becomes to be occurred several times in which a kind of "rolled kink" is remained. And then in accordance with such as the optical fiber laser or the like even in a case where the optical fiber is to be rolled up to another bobbin or the like and then to be maintained as a predetermined coil shape in order to house into the housing of the apparatus, the optical fiber cannot help but become to be collapsed from the desired shape in response to such as an elasticity or the rolled kink or the like of the optical fiber itself. And then therefore in a case of performing the heat radiation of the optical fiber with making use of the thermo conductive molding body a kind of cohesiveness is required in order to settle the optical fiber to be the predetermined coil shape for the thermo conductive molding body so as to prevent from this kind of collapsing of the shape.

In the meantime however, in the case of the conventional thermo conductive molding body such as the hardness or an amount of the strain or the like is not proper in a case of being effected a compressive stress because the same contains a thermo conductive filler with a large quantity. And hence it is not able to desire the cohesiveness in order to fix the above mentioned optical fiber. Or, it may be possible to invent a method so as to fix an optical fiber by providing an adhesive layer on to a surface of the conventional thermo conductive molding body. However, it is not able to give a thermal conductivity as sufficiently to the adhesive layer which has a cohesion to be higher than or equal to a certain degree. And hence the thermal conductivity cannot help but become to be decreased.

And in the meantime, it may be possible to invent a method so as to reduce the hardness of the thermo conductive molding body and to decrease as excessively an impact resilience against the compression. However, in a case where an optical fiber is held on to a thermo conductive molding body which does not have the hardness as properly and an amount of strain against the compressive stress, there may not be occurred any collapse of the shape, in the meantime however, there may be a concern of which the bend loss may be occurred in the optical fiber because a localized bending becomes to be occurred as easily on to the optical fiber at the period of performing a molding of the coil state or of performing an assembly of the apparatus, and then because the same is held with a remaining of the bending.

On the contrary however, in accordance with the present second embodiment it becomes able to realize the holding of the amplifying optical fiber (106) at the state of which there is not occurred such as any slight bending or the like, and it becomes able to ensure the heat dissipation as sufficiently, with making use of the thermo conductive molding body (109b) which has the thermal conductivity to be higher than or equal to 0.5 W/mK, and which has the Asker C hardness to be between twenty and fifty in accordance with the holding apparatus (109).

Moreover, it is preferable for the characteristic of the thermo conductive molding body (109b) to have a compressive strength of which a peak value is between ten and thirty $N/cm^2$ and a stabilized value is between three and ten $N/cm^2$. Further, it is preferable for the same to have the thermal conductivity to be higher than or equal to 1.0 W/mK, to have the Asker C hardness to be between twenty-five and forty. Still further, it is further preferable for the same to have the thermal conductivity to be higher than or equal to 1.5 W/mK, to have the Asker C hardness to be between twenty-five and thirty-five, and to have the compressive strength of which the peak value is between fifteen and twenty-five $N/cm^2$.

Furthermore, it is able to perform a production of the thermo conductive molding body (109b) which has the above mentioned characteristics, by performing an addition of a thermo conductive filler, such as an aluminum oxide, a magnesium oxide, a boron nitride, an aluminum nitride, an aluminum hydroxide, a magnesium hydroxide, or the like, into a base rubber which is to contain the same with a predetermined quantity in which such as an acrylic rubber and a thermoplastic elastomer and the like are mixed with a predetermined compounding ratio, and then by performing the molding of the thermo conductive composition of matter into a sheet shape as desired in which a softening agent is designed to be contained as properly.

Examples 8 to 14, Comparative Examples 6 to 10

Next, the present invention will be described in further detail below, with being based on Examples and Comparative examples. However, the present invention is not to be limited any of these.

Here, as Examples from 8 to 14 and Comparative examples from 6 to 10 in accordance with the present invention an optical fiber laser is manufactured that has a configuration which is similar to that is shown in FIG. 10. And then in this case a holding apparatus is designed to be a substance of which a thermo conductive molding body which has a thickness of three millimeters is rolled up to a drum which has an outside diameter of thirty centimeters and which is formed of aluminum with a predetermined constant tensile strength. Moreover, an amplifying optical fiber is rolled up thereon with a predetermined constant tensile strength and then fixed, which has a length of twenty meters. Further, the optical fiber laser is configured, for an intensity of an exciting light which is outputted from each of the semiconductor lasers of eighteen pieces so as to be set up to be ten watts, and for an intensity of a laser light which is outputted from an output terminal so as to be set up to be 100 watts.

Still further, for each of the Examples and for each of the Comparative examples each of thermo conductive molding bodies is made use which has a different composition from each other, respectively. And then each of the thermal conductivity, the Asker C hardness and the compressive strength is designed to be different from each other, respectively. As more specifically, at least one nature as a thermo conductive filler which is selected from a group of an aluminum oxide (A) which has a shape to be spheroidal and has an average grain diameter to be thirty-five micrometers, an aluminum oxide (B) which has a shape to be round and has an average grain diameter to be twenty-two micrometers and a aluminum hydroxide which has a shape to be indeterminate and has an average grain diameter to be eight micrometers, is mixed with a predetermined parts by mass with corresponding to 100 parts by mass of a base rubber in which a compounding ratio between an acrylic rubber and a thermoplastic elastomer is different therefrom. Still further, as a softening agent an oil (A) as an oil of a polyether ester system and an oil (B) as an oil of a paraffinic system are mixed with a predetermined parts by mass. And then by kneading and mixing those together a thermo conductive rubber composition of matter is produced. Still further, by pushing out the thermo conductive rubber composition of matter to be a sheet form which has a thickness of three millimeters by making use of an extruding machine so as to obtain a thermo conductive molding body. And thus this substance is made use.

Still further, each of the thermal conductivity, the Asker C hardness and the compressive strength is measured as follows for the thermo conductive molding body which is produced in such a manner. And then in the first instance, the thermal conductivity is measured, with being pursuant to the hot wire method which is specified in accordance with the JIS R 2616, by making use of the Quick Thermal Conductivity Meter which is produced by Kyoto Electronics Manufacturing Co., Ltd., at a state of which two sheets of the thermo conductive molding bodies are overlapped together to be in a two-ply form with having a thickness of six millimeters that individually corresponds to each of the Examples and of the Comparative examples. Still further, the Asker C hardness is measured by making use of a hardness meter of the Asker C type which is produced by KOBUNSHI KEIKI CO., LTD.

Still further, regarding the compressive strength the thermo conductive molding body in accordance with each of the Examples and of the Comparative examples is produced to have a dimensions of three millimeters times twenty millimeters times twenty millimeters, respectively. And then each of the samples is compressed by making use of a compression tester on the market with a speed of five millimeters per minute. And then each of the measurements are performed for each of the samples respectively, for a peak value at the time of compressing thirty percent of the thickness and for a stabilized value at the time of elapsing ten minutes with maintaining the condition.

And then thereafter each of the evaluations are performed for the produced optical fiber laser in accordance with each of the Examples and of the Comparative examples that will be described in detail below.

(Retentivity of a Coil Shape)

Here, a retentivity of a coil shape is defined to be at a state in accordance with the holding apparatus of which how much amount of time it is able to maintain the coil shape of the amplifying optical fiber. And then the evaluation of this retentivity of the coil shape is executed by performing a visual observation of a state of an amplifying optical fiber for every predetermined amount of elapsed time after molding into the coil shape to be fixed and then by confirming whether or not exist any collapse from the initial shape, such as a frayed spot on the amplifying optical fiber or a disconnection from the holding apparatus or the like. Moreover, the visual observation is performed after elapsing the amount of time for four hours, twenty-four hours, seventy-two hours, one hundred and twenty hours, and two hundreds and forty hours, after fixing to be the coil shape.

(Temperature of an Optical Fiber ($\Delta T$))

Here, a temperature of an optical fiber ($\Delta T$) is defined to be a difference of temperature between a temperature which is the highest in a range of vision of a thermograph and a room temperature in a case where a temperature distribution of an amplifying optical fiber is observed from an outer side by making use of the thermography (the Thermotracer TH9260) which has the function of switching between visible and infrared and which is produced by NEC Avio Infrared Technologies Co., Ltd.

(Results)

Here, FIG. 13 is a diagram for showing a characteristic of a thermo conductive molding body and a retentivity of a coil shape and a temperature of an optical fiber ($\Delta T$) regarding an optical fiber laser in accordance with the Examples from 8 to 14. And then as showing in FIG. 13, in accordance with the Examples from 8 to 14 the thermal conductivity of the thermo conductive molding body is higher than or equal to 0.5 W/mK, and the Asker C hardness is between twenty and fifty as well. And hence it becomes able to obtain the retentivity of the coil shape without changing, and also it becomes able to suppress the temperature of the optical fiber to be lower. Moreover, in accordance with the Examples 10 and the 11 the thermal conductivity becomes to be higher than or equal to 1.0 W/mK. And hence it becomes able to suppress the temperature rise of the optical fiber to be lower. Further, in accordance with the Examples from 12 to the 14 the thermal conductivity becomes to be higher than or equal to 1.5 W/mK. And hence it becomes able to suppress the temperature rise of the optical fiber to be further lower. Still further, in accordance with the Examples from 11 to the 14 the Asker C hardness becomes to be between twenty-five and forty which is within the further preferable range. Furthermore, the peak value of the compressive strength becomes to be between fifteen and twenty-five N/cm$^2$ which is within the further preferable range. And hence it becomes able to obtain the cohesiveness to be at the optimum state at the period of holding the optical fiber. And then it is considered that this point may contribute as well to the retentivity of the coil shape and to suppress the temperature of the optical fiber.

And in the meantime, FIG. 14 is a diagram for showing a characteristic of a thermo conductive molding body and a retentivity of a coil shape and a temperature of an optical fiber ($\Delta T$) regarding an optical fiber laser in accordance with the Comparative examples from 6 to 10. And then as showing in FIG. 14, in accordance with the Comparative examples 6 and the 7 the thermal conductivity of each of the thermo conductive molding bodies is not sufficient. And hence the temperature of the amplifying optical fiber becomes to be raised as uniformly respectively, that is to say, the temperature of the optical fiber ($\Delta T$) becomes to be increased. In accordance with the Comparative example 7 in particular, the temperature of the optical fiber ($\Delta T$) achieves to be +81° C. And then in a case of using under this state it can be predicted that it becomes a cause of a deterioration of the outer side cladding layer of the amplifying optical fiber, and hence it becomes a cause of a decrease of a lifetime of the apparatus in its turn. Moreover, in accordance with the Comparative examples 8 and the 9 each of the Asker C hardness and the compressive strength is not proper, and then it is not able to obtain the cohesiveness as sufficiently. And hence it is not able to maintain the coil shape, and then the amplifying optical fiber becomes to be detached from the holding apparatus after twenty-four hours. Further, in accordance with the Comparative example 10 the thermo conductive molding body becomes to be soft as excessively. And hence the localized bending becomes to be occurred on the amplifying optical fiber. And then the large amount of the temperature rise, that is to say, the increase of the temperature of the optical fiber ($\Delta T$) becomes to be occurred at that part.

Modified Examples

Here, a holding apparatus which is available to be made use for the above described second embodiment is not to be limited to that is shown in FIG. 10. And then the modified examples of the holding apparatus that are individually available to make use for the second embodiment will be described in detail below.

Modified Example 4

Figure 15:
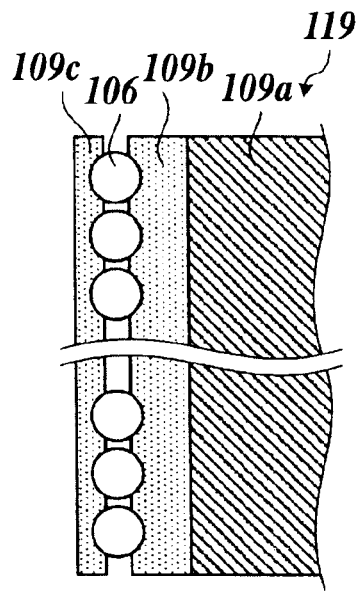
FIG. 15 is a cross sectional view exemplary showing a vicinity of a peripheral surface of the holding apparatus in accordance with the Modified example 4.

Here, FIG. 15 is a cross sectional view for exemplary showing a vicinity of a peripheral surface of the holding apparatus in accordance with the Modified example 4. And then as showing in FIG. 15, a holding apparatus (119) in accordance with the Modified example 4 comprises a base substance (109a) and a thermo conductive molding body (109b), that are individually similar to that in accordance with the holding apparatus (109) which is shown in FIG. 10. Moreover, the same further comprises a thermo conductive sheet (109c). And then this thermo conductive sheet (109c) is designed to be rolled up so as to cover the amplifying optical fiber (106) which is rolled up on to a peripheral surface of the thermo conductive molding body (109b). Further, the same has the thermal conductivity to be higher than or equal to 0.5 W/mK, and has the Asker C hardness to be between twenty and fifty as well, that are individually equivalent to that in accordance with the thermo conductive molding body (109b). Still further, the thermo conductive sheet (109c) is designed to have a thickness to be such has between 0.5 millimeter and ten millimeters. Still further, in accordance with this holding apparatus (119) it becomes able to hold as further certainly the amplifying optical fiber (106) so as not to occur any excessive optical loss because of making use of the thermo conductive molding body (109b) and of the thermo conductive sheet (109c). Still further, it becomes able to perform a radiation of heat which is generated therein as further promptly with comparing to the case where only the thermo conductive molding body (109b) is made use.

Furthermore, as a further modified example of the present Modified example 4, it may be available to have a configuration of which the thermo conductive molding body (109b) is eliminated from the configuration which is shown in FIG. 15, and in the meantime, the amplifying optical fiber (106) is rolled up to the base substance (109a), and then the thermo conductive sheet (109c) is rolled up so as to cover the amplifying optical fiber (106).

Modified Example 5

Figure 16:
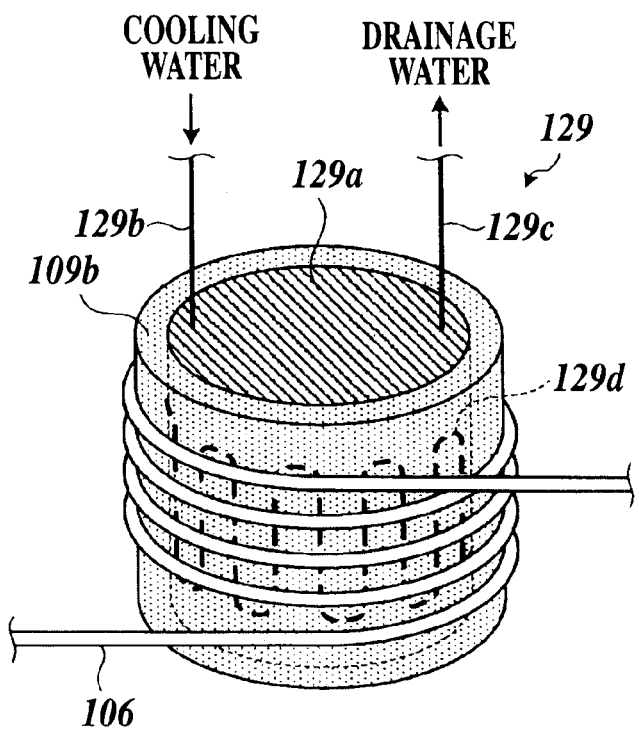
FIG. 16 is an exemplary drawing showing a holding apparatus in accordance with the Modified example 5.

Here, FIG. 16 is an exemplary drawing for showing a holding apparatus in accordance with the Modified example 5. And then as showing in FIG. 16, a holding apparatus (129) in accordance with the Modified example 5 comprises a base substance (129a) which is formed of a metal, such as aluminum or the like, and a thermo conductive molding body (109b), that are individually similar to that in accordance with the holding apparatus (109) which is shown in FIG. 10. Moreover, the amplifying optical fiber (106) is designed to be rolled up on to a peripheral surface of the thermo conductive molding body (109b). Further, each of pipe arrangements from (129b) to (129d) as a cooling unit is designed to be set at the base substance (129a), which is different from that in accordance with the holding apparatus (109). Still further, one end of each of the pipe arrangements (129b) and the (129c) is connected to a water supply and drainage mechanism of such as a pump or the like which is arranged at an outer side, and in the meantime, the other end is connected to the pipe arrangement (129d). Still further, the pipe arrangement (129d) is designed to be arranged all over a vicinity of a periphery at an inner side of the base substance (129a). And then in accordance with the pipe arrangement (129b) a cooling water which is supplied from the water supply and drainage mechanism becomes to be introduced into the pipe arrangement (129d). And then in accordance with the pipe arrangement (129d) the cooling water becomes to be flowed through the inner side of the base substance (129a). And then in accordance with the pipe arrangement (129b) the cooling water becomes to be drained from the pipe arrangement (129d) to the water supply and drainage mechanism. And then in this case because of the cooling water which is flowing through the pipe arrangement (129d) the thermo conductive molding body (109b) becomes to be cooled down. And hence the heat which is generated in the amplifying optical fiber (106) becomes to be radiated as further promptly. Still further, it may be available to make use of a cooling medium, such as a coolant or the like, in the place of the cooling water.

Modified Example 6

Figure 17:
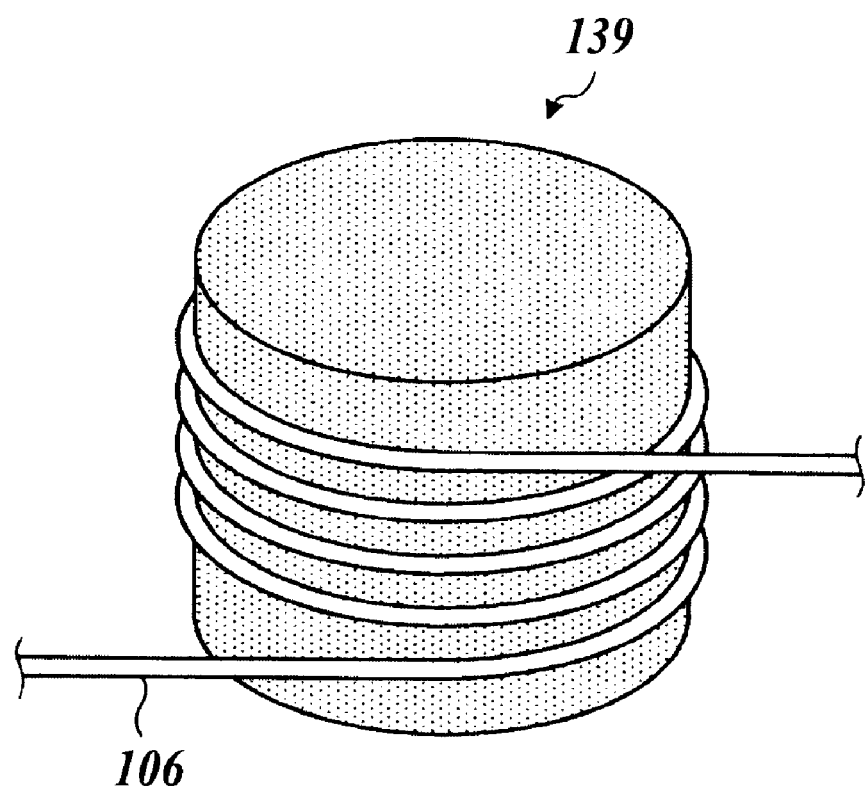
FIG. 17 is an exemplary drawing showing a holding apparatus in accordance with the Modified example 6.

Here, FIG. 17 is an exemplary drawing for showing a holding apparatus in accordance with the Modified example 6. And then as showing in FIG. 17, the holding apparatus (139) in accordance with the Modified example 6 has a cylindrical shape, that is comprised of a thermo conductive molding body, of which the thermal conductivity is designed to be higher than or equal to 0.5 W/mK, and the Asker C hardness is designed to be between twenty and fifty as well, respectively. And then the amplifying optical fiber (106) is designed to be rolled up on to a peripheral surface which is formed of the thermo conductive molding body of this holding apparatus (139). And hence in accordance with this type of the holding apparatus (139) it becomes able to obtain the heat dissipation to be higher, and it becomes able to hold the optical fiber with having the optical loss to be lower as well.

Moreover, it may be available to apply the thermo conductive sheet (109c) in accordance with the above described Modified example 4 to the holding apparatus (129) and the (139) as well in accordance with the corresponding Modified examples 5 and the 6, respectively. Further, it may be available to apply the pipe arrangements from (129b) to the (129d) in accordance with the above described Modified example 5 to the holding apparatus (139) as well in accordance with the Modified example 6. Still further, for a cooling unit it is not to be limited to the example of which both of the pipe arrangements from (129b) to the (129d) and the cooling water are made use together in accordance with such as the Modified example 5 or the like. And then it may be available to set such as a Peltier element or the like at an outer surface of a holding apparatus and then to make use the same as a cooling unit.

Still further, in accordance with each of the above described embodiments and with each of the corresponding Modified examples the holding apparatus is designed to have the cylindrical shape, however, it may be available for the same if any bend loss is not occurred in an optical fiber which is to be held. And then it may be available for the same to have such as a elliptic cylindrical shape or the like. Still further, the holding apparatus is not to be limited to the cylindrical shape to be solid. And then it may be available for the same to be hollow as well.

Still further, in accordance with each of the above described embodiments and with each of the corresponding Modified examples the holding apparatus is designed so as to hold the amplifying optical fiber. However, an optical fiber which is to be held is not to be limited to any of those. For example, a nonlinear optical fiber can be made use for inputting a light which has an intensity to be higher, in which a four wave mixing is made use as the nonlinear optical effect, and the zero dispersion wavelength characteristic is to be made use that has a temperature dependency. And then therefore if the holding apparatus in accordance with the present invention is applied ro an optical fiber it becomes able to prevent the zero dispersion wavelength from a fluctuation. And hence it becomes able to prevent an efficiency of the occurrence of the four wave mixing from decreasing. Furthermore, it becomes able to maintain the reliability of the nonlinear optical fiber and of the apparatus in which the same is to be made use.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber holding apparatus, comprising:
   a surface in order to hold an optical fiber which is to be a state of which is rolled up so as not to overlap with each other,
   wherein at least said surface is formed of a thermo conductive molding body that contains a base rubber composed of an acrylic rubber and a thermoplastic elastomer, a thermo conductive filler, and a softening agent, and
   wherein said thermo conductive molding body has a thermal conductivity higher than or equal to 0.5 W/mK, and an Asker C hardness between twenty and fifty.

2. The optical fiber holding apparatus according to claim 1, wherein said thermo conductive molding body has a peak value of compressive strength between ten and thirty N/cm$^2$ and a stabilized value of compressive strength between three and ten N/cm$^2$.

3. The optical fiber holding apparatus according to claim 1, wherein said thermal conductivity is higher than or equal to 1.0 W/mK and has said Asker C hardness is between twenty-five and forty.

4. The optical fiber holding apparatus according to claim 1, wherein said thermal conductivity is higher than or equal to 1.5 W/mK, said Asker C hardness is between twenty-five and thirty-five, and a peak value of compressive strength of the thermo conductive molding body is between fifteen and twenty-five N/cm$^2$.

5. The optical fiber holding apparatus according to claim 1, wherein said thermo conductive molding body is comprised of a plurality of thermo conductive sheets that are formed by accumulation, and said optical fiber is held to be sandwiched between a surface on each of said thermo conductive sheet of said plurality of thermo conductive sheets that faces a surface of an adjacent thermo conductive sheet of said plurality of thermo conductive sheets.

6. The optical fiber holding apparatus according to claim 1, further comprising:
   a cooling unit which is set at an inner part or an outer surface of the holding apparatus.

7. An optical fiber holding apparatus, comprising:
   a peripheral surface in order to roll up and hold an optical fiber,
   wherein said peripheral surface is formed of a thermo conductive molding body that contains a base rubber composed of an acrylic rubber and a thermoplastic elastomer, a thermo conductive filler, and a softening agent, and
   wherein said thermo conductive molding body has a thermal conductivity higher than or equal to 0.5 W/mK and an Asker C hardness between twenty and fifty.

8. The optical fiber holding apparatus according to claim 7, wherein said thermo conductive molding body has a peak value of compressive strength between ten and thirty N/cm$^2$ and a stabilized value of compressive strength is between three and ten N/cm$^2$.

9. The optical fiber holding apparatus according to claim 7, wherein said thermal conductivity is higher than or equal to 1.0 W/mK and has said Asker C hardness is between twenty-five and forty.

10. The optical fiber holding apparatus according to claim 7, wherein said thermal conductivity is higher than or equal to 1.5 W/mK, has said Asker C hardness is between twenty-five and thirty-five, and a peak value of compressive strength of the thermo conductive molding body is between fifteen and twenty-five N/cm$^2$.

11. The optical fiber holding apparatus according to claim 7, further comprising: a base substance which has a cylindrical shape; wherein said thermo conductive molding body is provided at a periphery of said base substance.

12. The optical fiber holding apparatus according to claim 7, further comprising: a thermo conductive sheet provided in order to cover said optical fiber that is rolled up on said peripheral surface,
   wherein a thermal conductivity of said thermo conductive sheet is higher than or equal to 0.5 W/mK, and an Asker C hardness of said thermo conductive sheet is between twenty and fifty.

13. The optical fiber holding apparatus according to claim 7, wherein
   the thermo conductive molding body forming the peripheral surface has a cylindrical shape.

14. An optical fiber holding apparatus comprising:
   a surface that holds an optical fiber in a rolled up state such that the optical fiber does not overlap,
   wherein the surface is formed of a thermo conductive molding body that is comprised of a plurality of thermo conductive sheets that are formed by accumulation, and the optical fiber is held to be sandwiched between a surface on each thermo conductive sheet of the plurality of thermo conductive sheets that faces a surface of an adjacent thermo conductive sheet of the plurality of thermo conductive sheets,
   wherein the thermo conductive molding body has a thermal conductivity greater than or equal to 0.5 W/mK, and an Asker C hardness between twenty and fifty.

15. An optical fiber holding apparatus, comprising:
   a base substance which has a cylindrical shape in order to roll up and hold an optical fiber; and
   a thermo conductive sheet, which is provided in order to cover said optical fiber that is rolled up,
   wherein said thermo conductive sheet contains a base rubber composed of an acrylic rubber and a thermoplastic elastomer, a thermo conductive filler, and a softening agent, and wherein said thermo conductive sheet has a thermal conductivity higher than or equal to 0.5 W/mK and an Asker C hardness between twenty and fifty.

16. The optical fiber holding apparatus according to claim 7, further comprising:

a cooling unit which is set at an inner part or an outer surface of the holding apparatus.

* * * * *